United States Patent [19]

Michel et al.

[11] Patent Number: 4,971,822
[45] Date of Patent: Nov. 20, 1990

[54] SOLID COMPOSITION OF SORBITOL AND PHOSPHATES

[75] Inventors: Serpelloni Michel, Beuvry les Bethune; Rossi Laurent, Lillers, both of France

[73] Assignee: Roquette Freres, Lestrem, France

[21] Appl. No.: 333,290

[22] Filed: Apr. 5, 1989

[30] Foreign Application Priority Data

Apr. 8, 1988 [FR] France ................ 88 04722

[51] Int. Cl.$^5$ .............................. A23B 4/00
[52] U.S. Cl. ........................ 426/332; 426/643
[58] Field of Search .............. 426/643, 332, 96

[56] References Cited

U.S. PATENT DOCUMENTS 4,168,323  9/1979  Inamine ................ 426/643
4,708,055 11/1987  Matsumoto ............ 426/643

Primary Examiner—Carolyn Paden
Attorney, Agent, or Firm—Larson & Taylor

[57] ABSTRACT

A solid composition based on sorbitol and phosphates for the manufacture of a freezing adjuvant for foodstuffs based on minced meat, comprises from 1 to 20% of phosphates, the sorbitol entering into its constitution having a fusion enthalpy higher than 150 joules/gram.

11 Claims, No Drawings

SOLID COMPOSITION OF SORBITOL AND PHOSPHATES

BACKGROUND OF THE INVENTION

The invention relates to a solid composition based on sorbitol and phosphates.

It is directed also to a process for the preparation of this composition as well as the use of the latter for the preparation of freezing additives or adjuvants for foodstuffs based on minced meat.

It relates more particularly to foodstuffs which are based on marine animal meat and particularly fish; these foodstuffs are known under the Japanese collective term of "KAMABOKO" which covers a whole range of "seafood products"; the essential constituent of these KAMABOKO type foodstuffs is a raw material denoted by the term, also Japanese, of "SURIMI". This is fish meat from which the skin, bones and guts have been removed and which is minced after prolonged washing with water.

The remoteness of fishing grounds and the fact that the production of SURIMI of satisfactory quality requires the use of extremely fresh fish meat results in this product being increasingly manufactured directly on board of factory ships where it is frozen in order to be preservable until the time of its use for the manufacture, for example, of KAMABOKO.

Now, freezing causes the SURIMI and consequently the final foodstuff of which it is an important constituent to lose irreversibly its functional properties. These functional properties comprise the elasticity of the gel formed after the cooking of the SURIMI and the degree of whiteness of this SURIMI.

It has been proposed, particularly following studies carried out by NISHIYA and TAKEDA in the laboratories of the "fisheries of Hokkaido" in 1959, to introduce into chopped fish intended for freezing, cryoprotective agents enabling the SURIMI to conserve its functional properties.

The most effective cryoprotective agents are particularly sorbitol, phosphates or polyphosphates and emulsifiers and/or fats.

It has been proposed to introduce these cryoprotective agents at the level of the choppers, which constitutes a convenient manner of distributing them as uniformly as possible in the fish meat to be minced and frozen.

However, to reduce the handling operations and to gain space, especially when manufacturing SURIMI on board ship, it is preferred to use these cryoprotective agents in the form of a composition of cryoprotective agents, that is to say of a single freezing adjuvant.

It has been proposed to resort, as a single freezing adjuvant, to mixtures of sorbitol powder and phosphates on to which has been sprayed the emulsifier and/or the fat, or again to resort to a product obtained by spraying on to sorbitol powder, of a premix of emulsifiers and/or of fats and phosphates.

Unfortunately, the freezing adjuvant so obtained does not give satisfaction to the user since, considering that the granulometry of the sorbitol is different from that of the phosphates, segregation phenomena occur according to the size of the particles, especially in the course of pneumatic transportation of the adjuvant. This phenomenon is manifested by variations in the composition of the adjuvant progressively with its use and consequently by variations in the conservation of the functional properties of the final SURIMI.

SUMMARY OF THE INVENTION

It has been proposed, to avoid these segregation problems, to form a solid composition of sorbitol containing phosphates, which solid composition is obtained by introduction of phosphates into the sorbitol in the molten state, followed by crystallization of the mixture, the final freezing adjuvant being prepared by spraying onto the solid composition, of the emulsifier and/or of the fat.

Now, it appeared that the solid compositions so obtained absorb much less the emulsifier and/or the fats than sorbitol crystals not containing phosphates and that the freezing adjuvants formulated from such solid compositions with a content of emulsifier and/or fats sufficient to preserve the functional properties of the SURIMI, showed themselves to be unusable, the reduction of the absorption capacity of the solid compositions being all the more marked as their content of phosphates was greater.

In fact, the solid composition, incapable of absorbing sufficiently the emulsifier and/or the fats, conserves the latter at its surface, which confers an extremely greasy and sticky appearance on the corresponding freezing adjuvant, which does not form a free-flowing powder and which is, whatever its granulometry, very subject to clumping.

DESCRIPTION OF THE PREFERRED EMBODIMENTS

Applicants have established, after thorough research, the fact that the absorption capacity with respect to emulsifiers and/or fats of solid compositions of sorbitol and of phosphates is, unexpectedly, associated essentially with the crystallinity of the sorbitol contained in the said solid compositions, and that the presence of phosphates inhibited the appearance of this crystallinity, all other parameters and especially the granulometry, the porosity and the specific surface of the crystals constituting these solid compositions, remaining otherwise unchanged.

The crystallinity of sorbitol being directly proportional to its fusion enthalpy, it follows that the absorption capacity of the solid compositions of sorbitol and of phosphates is also directly proportional to the fusion enthalpy of sorbitol.

Applicants have had the merit of discovering that the absorption capacity of a solid composition of sorbitol and of 1 to 20% of phosphates becomes acceptable as soon as the fusion enthalpy of the sorbitol which is part of its constitution is higher than 150 joules/gram, preferably higher than 155 joules/gram and still more preferably higher than 160 joules/gram.

The invention therefor relates, as novel industrial products, to a solid composition of sorbitol and of 1 to 20% by weight of phosphates characterized by the fact that the sorbitol entering into its constitution has a fusion enthalpy higher than 150 joules/gram, preferably higher than 155 joules/gram and still more preferably higher than 160 joules/gram.

These solid compositions, due to the fact of the higher value of the crystallinity of the sorbitol that they contain with respect to the crystallinity of the sorbitol of the solid compositions of the prior art, have an absorption capacity for emulsifiers and/or fats which is distinctly increased and permit the formulation of freezing adjuvants which, whilst containing said emulsifiers and/or fats in sufficient amount to permit the preservation of the functional properties of frozen SURIMI, conserve at the same time the properties of a free-flowing powder, which is devoid of tendency for clumping and which can be obtained by a simple process.

The freezing adjuvant according to the invention is characterized by the fact that it compries from 70 to 99.5% by weight of the abovesaid solid composition in which the sorbitol has a fusion enthalpy higher than 150 joules/gram, preferably higher than 155 joules/gram and still more preferably higher than 160 joules/gram, the complement to 100% being essentially contributed by emulsifiers and/or fats absorbed by the constituent particles of the solid composition.

The freezing adjuvant according to the invention is employed in foodstuffs based on minced meat in a proportion from about 1 to about 12% by weight with respect to the weight of meat.

The process according to the invention for preparing the composition of sorbitol and of phosphates according to the invention having the above-mentioned properties, is characterized by the fact that an intimate mixture of sorbitol and phosphates is extruded under conditions such that said mixture is brought, at the oulet of the die of the extrusion apparatus, to a temperature of about 85° to about 100° C., by means of which the crystallization of the sorbitol is effected.

The abovesaid extrusion may be performed, for example, on the machines disclosed in U.S. Pat. No. 3,618,902 to TELEDYNE INC. and whose application to the manufacture of powdered sorbitol has been disclosed in U.S. Pat. No. 4,252,794 to I.C.I., or again in the manner which has been disclosed in French Patent No. 2,072,535 to TOWA KASEI; the text of these patents is herein incorporated by reference; the extrusion can also be performed on a machine of the dual screw type, for example that marketed by the WERNER PFLEIDERER Company.

The fusion enthalpy of the sorbitol contained in the solid composition can be determined by means of a differential thermal analyser, for example that marketed under the trademark ATD 2000 by the METTLER Company.

The speed of heating employed is 2° C./minute and the sensitivity of the apparatus is adjusted to 200 microvolts.

The measurement is carried out each time on an amount of solid composition or of freezing adjuvant, that is to say of the solid composition impregnated with emulsifier and/or fat, in the neighbourhood of 6 mg, whose weight is precisely known.

The apparatus is standardized by means of indium and the integration of the surface situated below the recorded curve is performed between 60° and 105° C. Under these conditions, the presence of the other ingredients, namely the fats, the emulsifiers and the phosphates, does no interfere with the fusion of the sorbitol contained in the solid composition and the fusion enthalpy of this sorbitol is obtained by dividing the result obtained by the richness in real sorbitol of the product subjected to analysis.

This richness in real sorbitol of the solid composition or of the freezing adjuvant may be determined by high pressure liquid chromatography, for example on an apparatus of the WATERS brand provided with a differential refractometric detector.

The chromatography is performed on a cationic resin column in calcium form of the HPX 87 C type of BIORAD and the elution is effected with water at 85° C. at a flow rate of 0.5 ml/min. The richness in sorbitol is determined by external gauging.

The measurement of the absorption capacity of the solid composition for emulsifiers and/or fats is determined as indicated below.

An amount of 44 grams of sorbitol or of solid composition whose granulometry is situated in a range of 630 to 800 microns is mixed with 66 grams of SPAN 80 (emulsifier constituted by the monooleic ester of sorbitan).

The mixture obtained is allowed to stand without stirring for 16 hours in an oven whose temperature is regulated to 50° C.

At the end of this period and after cooling to 20° C., the mixture is re-suspended by gentle stirring and the determination of its viscosity is carried out by means of a BROOKFIELD viscosimeter.

The more the emulsifier is absorbed by the sorbitol powder or the solid composition, the less will be the amount of fluid phase remaining between the crystals and the higher will be the viscosity of the mixture. In other words, the higher the viscosity of the mixture, the more absorbent is the sorbitol powder or the solid composition.

A certain number of products which have been manufactured as indicated below, were tested.

Product 1

Crystalline sorbitol was manufactured by employing the process described in French Patent No. 7236437 of which Assignee is proprietor and whose description is incorporated here by reference; this process consists of mixing molten sorbitol with a dry matter content higher than 96% continuously in the form of bundles, sheets, fine streams or droplets with 20 to 80% by weight of sorbitol in fine powder form, the mixing being carried out in an open rotary container with axis of rotation inclined to the horizontal, at the surface of the mixture placed in motion consequent upon the rotation of the container.

Product 2

This is a solid composition containing 5.7% of phosphates of which 2.85% is sodium tripolyphosphate and 2.85% is neutral sodium pyrophosphate; it was manufactured by the same process as Product 1, the phosphates being premixed with the sorbitol.

Product 3

This is a solid composition according to the invention containing 7% of phosphates which was manufactured in the manner indicated below.

Into a TELEDYNE READCO extrusion installation as disclosed in U.S. Pat. No. 4,252,794, is introduced a mixture composed of, for 100 parts by weight of sorbitol, 3.76 parts of sodium tripolyphosphate and 3.76 parts of neutral sodium pyrophosphate, and the extrusion is conducted so that at the outlet from the extruder the temperature of the solid composition of sorbitol and phosphates is 90° C. After cooling, the product obtained is ground and then sifted.

Product 4

This is a solid composition according to the invention containing 13% of phosphates.

Procedure was as for Product 3 but by introducing into the extruder, per 100 parts by weight of sorbitol, 7.5 parts of sodium tripolyphosphate and
7.5 parts of neutral sodium pyrophosphate.

A composition of cryoprotective agents according to the prior art was also tested, this composition which is marketed under the trademark PREBEST TP 433 by UENO Company (Japan) having the following constituents:

| | |
|---|---|
| sorbitol | 87% |
| fatty ester of glycerol | 6.5% |
| polyphosphates | 6.5% |

In Table I are collected for Products 1 to 4, as well as for the PREBEST TP 433, the values:
- of the fusion enthalpies of the powders ($\Delta H$ in J/g),
- of the richnesses in sorbitol of these powders (% of sorbitol),
- of the fusion enthalpy of the sorbitol contained in these powders,
- of the results of the viscosity test carried out in the manner which has been described above.

TABLE I

| | $\Delta H$ in J/g | % of sorbitol | $\Delta H$ of the sorbitol | Viscosity in centipoises |
|---|---|---|---|---|
| Product 1 | 166 | 99 | 167.7 | 58,400 |
| Product 2 | 118 | 93.35 | 126.4 | 29,600 |
| Product 3 according to the invention | 154 | 92.1 | 167.3 | 53,600 |
| Product 4 according to the invention | 132 | 86.1 | 153.25 | 35,250 |
| PREBEST TP 433 | 128 | 87 | 147.1 | — |

With regard to the values collected in Table I, it is observed that the greater the fusion enthalpy of the sorbitol, the higher the viscosity, hence the greater the absorption power of the crystals.

There were prepared, by means of Products 2 and 3, freezing adjuvants for foodstuffs based on minced meat by proceeding in the manner indicated below.

Into a planetary mixer, for example of the LODIGE type, were introduced 50 kg of Product 2 in the first case and 50 kg of Product 3 in the second case, the granulometry of these products being situated within a range of 630 to 800 microns, then in each case 2.82 kg of SPAN 80; the latter was reheated previously to 45° C. and introduced into the mixer in a time lapse of 5 minutes by spraying on to the mass of crystals of the solid composition.

The powder obtained with Product 2 is greasy and sticky and shows a certain tendency to clumping whilst the powder obtained with Product 3 according to the invention absorbs the emulsifier better, is whiter, has no greasy nor sticky appearance and flows freely.

I claim:

1. Solid composition in the form of a free-flowing powder of particles comprising sorbitol and 1 to 20% by weight of phosphates, wherein the sorbitol has an enthalpy of fusion higher than 150 joules/gram.

2. Solid composition according to claim 1, wherein the sorbitol has an enthalpy of fusion higher than 155 joules/gram.

3. Solid composition according to claim 1, wherein the sorbitol has an enthalpy of fusion higher than 160 joules/gram.

4. Freezing additive for food on the basis of minced fish, said freezing additive comprising from 70 to 99.5% by weight of a solid composition in the form of a free flowing powder of particles comprising sorbitol and 1 to 20% by weight of phosphates, wherein the sorbitol has an enthalpy of fusion higher than 150 joules/gram, the balance to 100% consisting essentially of emulsifiers, fats or mixtures thereof which are absorbed by the particles of the said solid composition.

5. Freezing additive according to claim 4, wherein the sorbitol has an enthalpy of fusion higher than 155 joules/gram.

6. Freezing additive according to claim 4, wherein the sorbitol has an enthalpy of fusion higher than 160 joules/gram.

7. Process for the preparation of a solid composition in the form of a free flowing powder of particles comprising sorbitol and 1 to 20% by weight of phosphates, wherein the sorbitol has an enthalpy of fusion higher than 150 joules/gram, comprising mixing the sorbitol and the phosphates and extruding the thus obtained mixture through an extrusion die under conditions such that the temperature of the mixture being extruded is raised to a value of about 85° to 100° C. at the outlet of the extrusion die.

8. Process for the preparation of a food on the basis of minced fish, comprising chopping the fish and, at the moment of chopping the fish, blending therewith, at a lower temperature, about 1 to about 12% by weight based on the weight of fish, of a freezing additive comprising from 70 to 99.5% by weight of a solid composition in the form of a free flowing powder of particles comprising sorbitol and 1 to 20% by weight of phosphates, wherein the sorbitol has an enthalpy of fusion higher than 150 joules/gram, the balance to 100% consisting essentially of emulsifiers, fats or mixtures thereof which are absorbed by the particles of the said solid composition.

9. Process according to claim 8, wherein the sorbitol has an enthalpy of fusion higher than 155 joules/gram.

10. Process according to claim 8, wherein the sorbitol has an enthalpy of fusion higher than 160 joules/gram.

11. Process according to claim 8, wherein blending with the freezing additive is carried out at a temperature below 10° C.

* * * * *